Dec. 18, 1956     W. S. FINKEN     2,774,561
LOAD-RETARDING CANOPY OF PREFORMED TYPE
Filed April 26, 1954
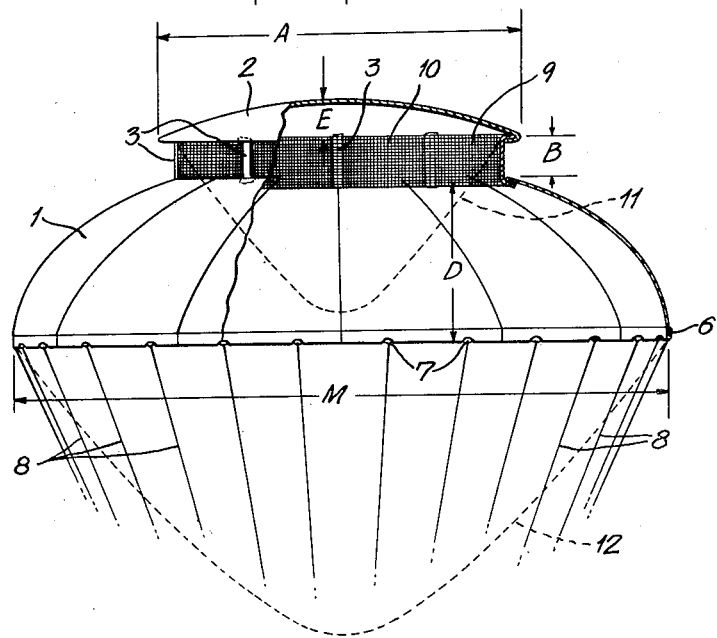
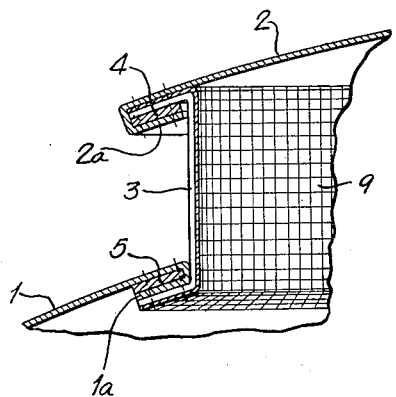
*INVENTOR.*
WALTER S. FINKEN
BY Robert A. Denham
*ATTORNEY*

United States Patent Office 2,774,561
Patented Dec. 18, 1956

2,774,561

LOAD-RETARDING CANOPY OF PREFORMED TYPE

Walter S. Finken, Brooklyn, N. Y., assignor to Leonard P. Frieder, Great Neck, N. Y.

Application April 26, 1954, Serial No. 425,447

4 Claims. (Cl. 244—145)

The present invention relates to load-retarding canopies or parachutes and is particularly directed to a canopy of the preformed spheroidal type.

The parachutes of the prior art may be classified either as flat parachutes or as preformed spherical or spheroidal parachutes. Flat parachutes are canopies which in their unstressed condition are flat pieces of sheet material, capable of lying at rest in a flat plane without wrinkles or folds. Preformed parachutes are constructed so that when unstressed, unwrinkled and unfolded, they have a curved surface, typically hemispherical or hemispheroidal, rather than a flat sheet. Preformed parachutes are usually constructed by sewing together a number of pieces or gores having curved contours.

Practically all parachutes in actual use before World War II were of the flat type. While preformed parachutes had been suggested previously, they were not widely used until the introduction of the hemispherical parachute disclosed in the U. S. Patent No. 2,412,392, issued to Walter S. Finken on December 10, 1946.

Flat parachutes are commonly subject to unequal stresses in various parts of the canopy. Specifically, when under load they are deformed to a more or less spheroidal shape, resulting in greater stress to the peripheral parts of the canopy than to the central parts. Reinforcing cords are used in such canopies to distribute and equalize the stresses. Flat parachutes also are subject to high pressure differences between the bottom and top sides of the canopy, particularly when first opening. Such high pressure differences tend to rupture the canopy, and to transmit a sudden shock to the load when the canopy opens. It is therefore common to provide holes in flat canopies, usually at or near the center, to relieve such high pressure differences.

Preformed canopies when in flight are not distorted substantially or unevenly from their unstressed contour. Consequently, the stress and pressure conditions throughout the canopy are substantially equalized, and forces tending to rupture the canopy are distributed over and resisted by substantially the whole canopy. Consequently, preformed canopies may be and indeed are usually constructed without reinforcing cords and without holes. They are also considerably more stable in their operating characteristics than flat canopies, and open more smoothly and with a reduced shock to the load, as compared to a flat canopy.

An object of the present invention is to provide an improved load-retarding canopy of the preformed type.

A further object is to provide a canopy of the type described in which full deployment is assured under any degree of loading or speed.

A further object is to provide a parachute of the type described in which the shock to the attached load when the parachute is deployed is reduced to a minimum.

Another object of the invention is to provide a canopy having more lifting or retarding force per unit area than prior art canopies.

Another object of the invention is to provide a load retarding canopy in which a greater pressure differential is developed between the inside and outside of the canopy, but whose development takes place relatively slowly, thereby avoiding a shock load upon deployment of the canopy.

Another object of the invention is to provide a canopy which develops a substantial lifting or retarding force over a greater proportion of its area than do prior art canopies.

Another object is to provide a canopy including means to change the direction of air moving through apertures in the canopy, so as to derive a lifting effect from that direction change.

Another object is to provide a canopy including means to maintain a uniform difference of pressures throughout a substantial peripheral area of the canopy, so as to avoid uneven pressure effects which tend to cause oscillation or gyration.

The foregoing objects of the invention are attained, in the structure described herein, by providing a preformed canopy having a structure described herein as a monitor top. The canopy comprises a lower spheroidal zone having a smaller diameter at its upper end than at its lower end, and open at both ends. On the upper end of this lower zone is attached the monitor top structure comprising a polar zone which may be spheroidal or spherical. Reinforcing bands are provided around the monitor top and around the upper end of the lower zone. The monitor top structure is connected to the lower zone by a series of spaced straps connecting the reinforcing bands at the edges of the two zones and extending vertically when the canopy is loaded. A high porosity fabric, for example, a netting, may cover the peripheral space between the upper and lower zones.

Other objects and advantages of the invention will become apparent from a consideration of the following specification and claims, taken together with the accompanying drawing.

In the drawing:

Fig. 1 is a view partly in elevation and partly in vertical section, showing a parachute embodying the invention as it appears when under load;

Fig. 2 is a fragmentary cross-sectional view similar to Fig. 1, showing on an enlarged scale the connection between the upper and lower zones of the canopy.

Referring to the drawing, there is shown a canopy including a preformed lower ellipsoidal zone 1 and a preformed upper ellipsoidal zone 2. The edges of the two zones are connected by a plurality of spaced straps 3. The two zones are, in effect, two separated segments of the same ellipsoid.

Each zone is constructed from a number of pieces or gores of material having curved edges, sewn together at the edges in a manner well understood in the art to form zons of the desired contours. The peripheral edge of the upper zone 2 is folded over to form a hem 2a within which is sewn a reinforcing webbing strip 4 which extends entirely around the periphery of the zone 2. The upper edge of the lower zone 1 is similarly folded over to form a hem 1a in which is sewn a reinforcing webbing strip 5 extending entirely around the periphery of the upper end of the lower zone.

The upper ends of the connecting strips 3 are inserted between the reinforcing webbing 4 and the zone 2 before the hem and the webbing are sewn together. The lower ends of the straps 3 are placed over the assembled hem 1a and webbing 5 before they are sewn together and all are sewn together at the same time.

The lower periphery of the lower zone 1 is formed with a hem 6 folded in a manner illustrated in detail in Patent No. 2,365,184, issued to Leonard P. Frieder and Walter S. Finken on December 19, 1944, and provided with a hem cord 7 as described in that patent for the attachment of shroud lines 8 to the canopy.

A high porosity fabric, such as a netting 9, is sewn to the straps 3, but not to the upper and lower zones. This arrangement ensures that the netting is spread when the canopy is deployed, and that stresses transmitted between zones 1 and 2 are carried by the straps 3 and not by the netting.

The preferred and practical ranges of the dimensional relationships of canopies constructed in accordance with the invention are as follows:

(1) The depth D of the lower zone 1 is preferably between 27% and 29% of the large diameter M of the lower zone, although in many cases an increase in the depth D above this range may be beneficial, especially with respect to the provision of greater buoyancy.

(2) The large diameter A of the upper zone 2 is preferably 66⅔% of the large diameter M of the lower zone, although it is entirely practical to make A anywhere from 50% to 66⅔% of M.

(3) The upper zone 2 should have its largest diameter at least equal to the smallest diameter of lower zone 1, and preferably 8% to 10% greater than that smallest diameter, so that the zones overlap. The overlapping portions are substantially equal in width to the hems 1a and 2a, so that these overlapping portions are substantially reinforced.

(4) The height B of the monitor wall must be determined, in each case, by the expected velocity of travel of the canopy through the air, and must be sufficient to keep the velocity head acting on the canopy within the range permitted by the strength of the canopy material.

(5) The upper zone 2 is preformed as a polar frustum or polar zone of a spheroid, or more preferably an ellipsoid. The diameter A of the base of zone 2 is substantially greater than the depth E of that zone.

When a canopy of the type described is first deployed, air entering the base opening of the lower zone passes through the upper opening of that zone and impinges on the under surface of the upper zone 2, producing a force tending to spread that zone, the magnitude of the force being determined by the velocity head of the air due to the advance of the canopy through it. The spreading force just described is aided considerably by a local reduction in the static pressure in the wake of the canopy, created by the advancing movement of the canopy through the air.

As the upper zone 2 spreads, under the influence of the forces and pressures just described, an inverted cone of compressed air is formed, as indicated by the dotted line 11 in the drawing, having its base at the upper zone 2 and its apex at a point above the base of the lower zone 1. The air in this cone is maintained in compression by the velocity head due to the forward movement of the canopy.

Air continues to enter the base of the lower zone and is deflected outwardly by the cone of compressed air, so that it impinges on the inner surface of the lower zone 1, thereby expanding it outwardly until it is fully inflated. Complete inflation requires only a fraction of a second at normal operating velocities.

After both zones of the canopy are fully inflated, air entering the base of the lower zone moves along a convergent path defined by the lower zone 1 and by the central cone of compressed air. As the air passes along this convergent path, its velocity increases as the cross-sectional area of the path narrows. This incoming air performs two functions, in that it maintains the air in cone 11 in a compressed state, and, by impinging on the inner surface of the lower zone 1, creates a force acting substantially at a right angle to that surface, which force has a component acting in a direction opposite to the direction of flight.

The air which enters the canopy moves more slowly through the canopy than the speed with which the canopy passes through the air. Consequently, there is formed a secondary inverted cone of compressed air, illustrated by the dotted line 12 in the drawing. The base of this secondary cone is at the base of the lower zone 1, and its apex is within the shroud lines. The height of this secondary cone is not as great as the height of the cone formed by other types of canopies, because a major portion of the air within this cone is moving through the canopy at a substantial velocity.

These two concentric inverted conical volumes of air provide three buoyancy factors which are improved as compared to canopies of the prior art, without in any way decreasing the stability factors. These three factors are:

First, the velocity head reaction force is increased as compared to prior canopies having crown openings. All the air entering the base of the present canopy is substantially stopped from movement relative to the canopy, parallel to its direction of motion, and this change in velocity of the air produces a retarding force substantially greater than that obtained in prior vented canopies, wherein part of the entering air passes through without change in direction.

Second, the difference between the pressure acting on the inner surface of the canopy and that acting on the outer surface is substantially increased, as compared with prior canopies.

Third, the area of the canopy over which the pressure differential is effective to apply a substantial retarding force is greatly increased. In prior art canopies, the lifting (retarding) force is mostly applied at the central portion of the canopy, and the peripheral portions contribute relatively little to the total. In the present canopy, as explained in detail above, the air impinging on the lower zone 11 produces a force having a substantial retarding component.

The air passing through the canopy leaves through the openings 10, in a direction substantially at right angles to the line of flight of the canopy, and at a high velocity. The overlap, or eave effect, at the periphery of upper zone 2, promotes this directional relation of the discharging air. This discharging flow of air tends to obstruct and baffle the flow of outside air which would otherwise flow directly into the low pressure space in the wake of the upper zone 2. The pressure in that space is thereby kept at a substantially lower value than it would otherwise have.

The area of the openings 10 may be computed mathematically, in relation to the total projected base area of the canopy and the expected operating velocity, to establish the velocity of the discharging air, which in turn determines the pressure in the wake of the canopy. Consequently, the pressure differential acting on the canopy can be predetermined at any value within a considerable range.

Furthermore, the discharge of air in all horizontal directions through the openings 10 tends to maintain a uniform pressure difference between the upper and lower sides of the lower zone 1, throughout the periphery of that zone. Consequently, oscillations and gyrations of the canopy are greatly reduced, since such oscillations and gyrations are commonly caused by unequal distribution of pressure differences about the canopy periphery.

While I have shown and described a preferred embodiment of my invention, other modifications thereof will readily occur to those skilled in the art and I therefore intend my invention to be limited only by the appended claims.

I claim:

1. A load-retarding canopy comprising a preformed lower zone of flexible sheet material having a circular horizontal cross-section throughout its depth and open at both ends, the opening at its upper end being of substantially smaller diameter than the opening at its lower end; a monitor top aligned with said upper opening and including a preformed upper zone of flexible sheet material having a circular horizontal cross-section throughout its depth, said upper zone being open at its lower end and closed at its upper end, and having its lowest diameter substantially greater than the diameter of the upper opening in the lower zone, so as to provide overlapping margins of the zones having substantial radial dimensions, the overlapping margins of the zones defining between them on air passage of substantial radial length and effective to direct an outward flow of air substantially at right angles to the path of movement of the canopy; means connecting the upper zone to the lower zone adjacent its upper opening, said connecting means comprising a plurality of flexible straps adapted to extend vertically when loaded and when vertically extended defining a plurality of peripheral openings between said zones; and a fabric screen extending between said straps and between said zones, said screen extending substantially vertically when the canopy is deployed and serving to distribute the flow of air evenly through said openings, said screen being sewed only to said straps and not to said zones, so that the stresses transmitted between said zones are carried by the straps and not by the screen.

2. A load-retarding canopy comprising a preformed lower zone of flexible sheet material having a circular cross-section throughout its depth and open at both ends, the opening at its upper end being of substantially smaller diameter than the opening at its lower end; a monitor top aligned with said upper opening and including a preformed upper zone of flexible sheet material having a circular horizontal cross-section throughout its depth, said upper zone being open at its lower end and closed at its upper end, and having its largest diameter substantially greater than the diameter of the upper opening in the lower zone and equal to from 50% to 66⅔% of the large diameter of the lower zone, so as to provide overlapping margins of the zones having substantial radial dimensions, the overlapping margins of the zones defining between them an air passage of substantial radial length and effective to direct an outward flow of air substantially at right angles to the path of movement of the canopy; and means connecting the upper zone to the lower zone adjacent its upper opening, said connecting means comprising a plurality of flexible straps adapted to extend vertically when loaded and when vertically extended defining a plurality of peripheral openings between said zones.

3. A load-retarding canopy comprising a preformed lower zone of flexible sheet material having a circular horizontal cross-section throughout its depth and open at both ends, the opening at its upper end being of substantially smaller diameter than the opening at its lower end; a monitor top aligned with said upper opening and including a preformed upper zone of flexible sheet material having a circular horizontal cross-section throughout its depth, said upper zone being open at its lower end and closed at its upper end, and having a vertical height equal to 12 to 13% of its greatest diameter, said greatest diameter being substantially greater than the diameter of the upper opening in the lower zone, so as to provide overlapping margins of the zones having substantial radial dimensions, the overlapping margins of the zones defining between them an air passage of substantial radial length and effective to direct an outward flow of air substantially at right angles to the path of movement of the canopy; and means connecting the upper zone to the lower zone adjacent its upper opening, said connecting means comprising a plurality of flexible straps adapted to extend vertically when loaded and when vertically extended defining a plurality of peripheral openings between said zones.

4. A load-retarding canopy comprising a preformed lower zone of flexible sheet material having a circular horizontal cross-section throughout its depth and open at both ends, the opening at its upper end being of substantially smaller diameter than the opening at its lower end; a monitor top aligned with said upper opening and including a preformed upper zone of flexible sheet material having a circular horizontal cross-section throughout its depth, said upper zone being open at its lower end and closed at its upper end, and having its lowest diameter substantially greater than the diameter of the upper opening in the lower zone, so as to provide overlapping margins of the zones having substantial radial dimensions, said zones having forms which are segments of the same geometrical ellipsoid, said overlapping margins extending substantially parallel and defining between them an air passage of substantial radial length and effective to direct an outward flow of air substantially at right angles to the path of movement of the canopy; and means connecting the upper zone to the lower zone adjacent its upper opening, said connecting means comprising a plurality of flexible straps adapted to extend vertically when loaded and when vertically extended defining a plurality of peripheral openings between said zones.

References Cited in the file of this patent

UNITED STATES PATENTS

| | | |
|---|---|---|
| 1,412,800 | Cooper | Apr. 11, 1922 |
| 1,427,771 | Ball | Sept. 5, 1922 |
| 1,862,247 | Tricau | June 7, 1932 |
| 2,447,187 | Kunkler | Aug. 17, 1948 |
| 2,527,553 | Ingels | Oct. 31, 1950 |

FOREIGN PATENTS

| | | |
|---|---|---|
| 146,525 | Austria | July 10, 1936 |
| 333,644 | France | Sept. 26, 1903 |
| 712,806 | France | Aug. 3, 1931 |